United States Patent
Daly

(10) Patent No.: US 6,374,685 B1
(45) Date of Patent: Apr. 23, 2002

(54) CREEP ENHANCED SENSOR ATTACHMENT ARRANGEMENT

(75) Inventor: Paul D. Daly, Troy, MI (US)

(73) Assignee: Siemens Automotive, Inc. (CA)

( * ) Notice: Subject to any disclaimer, the term of this patent is extended or adjusted under 35 U.S.C. 154(b) by 0 days.

(21) Appl. No.: 09/671,539

(22) Filed: Sep. 27, 2000

Related U.S. Application Data

(60) Provisional application No. 60/159,414, filed on Oct. 14, 1999.

(51) Int. Cl.$^7$ ................................................. G01D 21/00
(52) U.S. Cl. ........................................ 73/866.5; 73/824
(58) Field of Search ............................... 73/866.5, 856, 73/774, 204.22, 202.5, 818, 821, 823, 824

(56) References Cited

U.S. PATENT DOCUMENTS

| | | | | |
|---|---|---|---|---|
| 4,949,744 A | * | 8/1990 | Heed et al. ..................... 137/15 |
| 5,076,108 A | * | 12/1991 | Trimarchi .................. 73/866.5 |
| 5,186,050 A | * | 2/1993 | Lagace et al. ................. 73/187 |
| 5,578,772 A | * | 11/1996 | Kadis ......................... 73/866.5 |
| 6,019,007 A | * | 2/2000 | Grieger et al. ............. 73/866.5 |

FOREIGN PATENT DOCUMENTS

| | | |
|---|---|---|
| DE | 4423081 | 1/1996 |
| EP | 0204969 | 12/1986 |
| FR | 1282934 | 6/1962 |
| FR | 2678063 | 12/1992 |
| FR | 2692352 | 12/1993 |

\* cited by examiner

*Primary Examiner*—Max Noori

(57) ABSTRACT

A vehicle sensor assembly includes a vehicle sensor of a relatively low density material assembly for a vehicle fluid directing component such as an air intake manifold having a sensor receipt member formed of a relatively high density material. When the sensor is inserted into the sensor receipt member, the relatively softer sensor engagement surface is displaced from its free state by the relatively harder sensor receipt member engagement surface. The relatively softer sensor engagement surface is resilient and will always attempt to return to its free state position to relieve the high stress area. In attempting to return to its free state, the sensor engagement surface will "creep" toward a low stress area. The sensor body responds by "creeping" toward the vehicle fluid directing component. The present invention thereby takes advantage of the relief of residual stresses formed during insertion of the sensor body to tighten the mounting of the sensor into the vehicle fluid directing component.

25 Claims, 1 Drawing Sheet

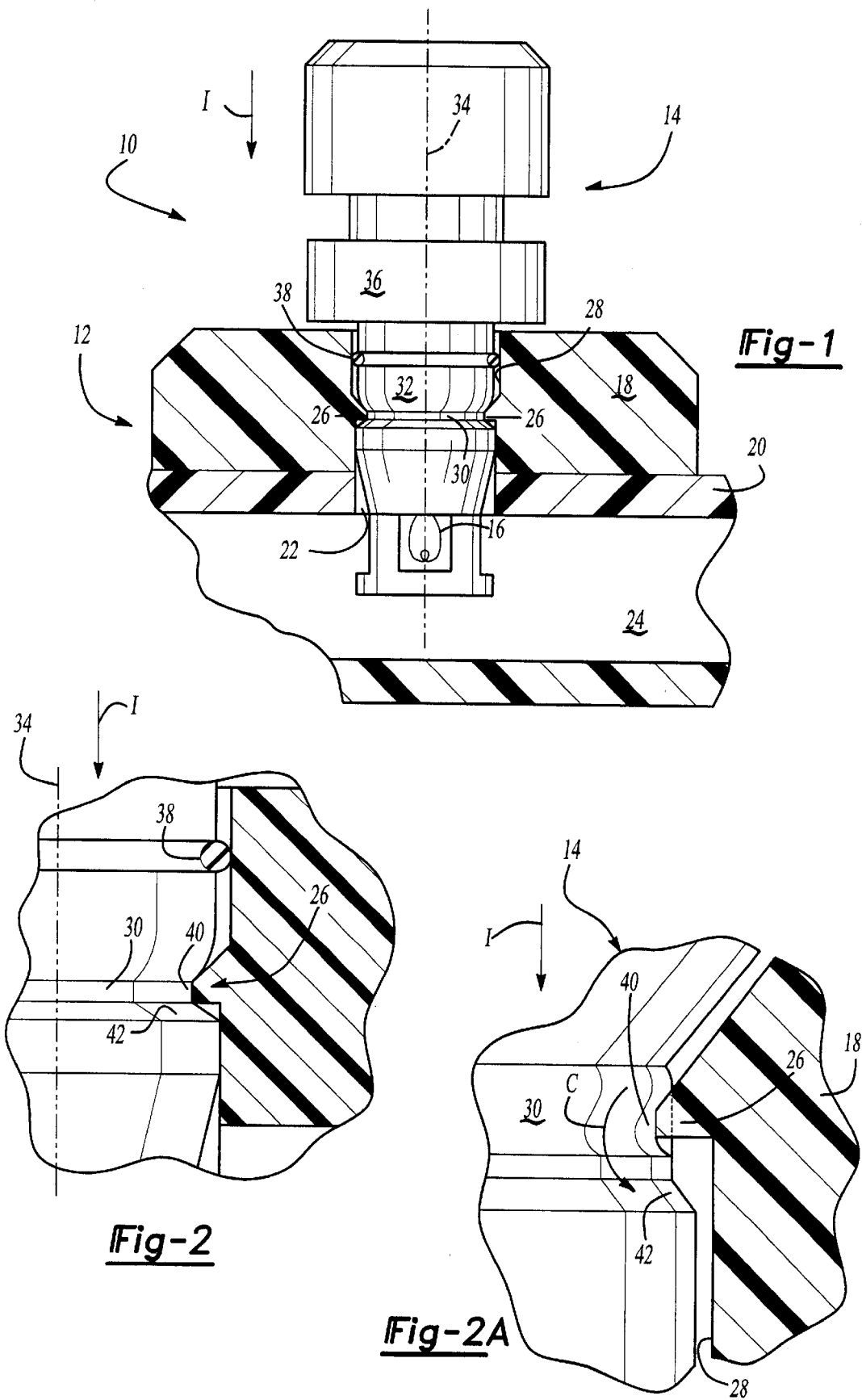

CREEP ENHANCED SENSOR ATTACHMENT ARRANGEMENT

The present application claims priority to U.S. Provisional Patent Application Ser. No. 60/159,414, filed Oct. 14, 1999.

BACKGROUND OF THE INVENTION

The present invention relates to a vehicle sensor, and more particularly to a sensor attachment arrangement for vehicle fluid directing component which provide an enhanced retention force over time.

Various types of air induction components such as air induction manifolds, air filter assemblies and throttle bodies are used in the field of internal combustion engines. Many known air induction components are presently manufactured of a non-metallic material such as nylon to simplify fabrication and reduce weight.

The prevalence of substantially non-metallic air induction components can create difficulties for the installation of sensors such as temperature sensors, manifold absolute pressure (MAP) sensors, mass air flow sensors, potentiometers and the like. Such sensors are commonly threaded directly into apertures in the air induction components. Other sensors include extended tabs which receive threaded fastener that enter the air induction components. During use over time, however, the air induction component heats up and the threaded sensor or fastener may tend to move away from its installed position. The sensor may then shift away from its original position and cause a degradation of performance.

Another known sensor attachment arrangement includes a barb which snaps onto a ledge. However, the known barb and ledge is relatively easy to disengage. A measure of a snap fit is the locking ratio which can be defined as the force to put the snap-fit in, divided by the force to take the snap fit object out. The locking ratio for the known barb arrangement is approximately 1:2. That is, it only requires approximately twice as much force to remove the barb as to insert it. A low locking retention ratio is particularly disadvantageous when located adjacent a high-vibration vehicle component.

Known sensor attachment arrangements are also typically unique for each particular sensor. The unique attachment arrangements complicate manufacture of the air induction component and increases the difficulties of substituting sensors for different vehicle and engine types.

Other known uses include provisions for creep in the attachment arrangement of toys. Typically, a barb and ledge or bayonet arrangement are provided on plastic toys which increase in retention force over time. However, the known toy attachment arrangements types are still relatively easy to disengage because of the simplified engagement arrangement.

Accordingly, it is desirable to provide a sensor assembly which can be easily, securely and inexpensively attached to a non-metallic fluid directing component and which provides an enhanced retention force as residual stresses formed during insertion are relieved. It is further desirable to provide a generic attachment arrangement to simplify manufacture of the air induction component and allow the interchangeability of sensors.

SUMMARY OF THE INVENTION

The present invention provides a vehicle sensor assembly of a relatively low density material for a vehicle fluid directing component such as an air intake manifold having a sensor receipt member formed of a relatively high density material. The sensor assembly includes a sensor engagement surface such as groove in a locating segment of the sensor. The sensor engagement surface defines an outer periphery dimension and a sensor receipt member engagement surface defines an inner periphery dimension which is of a smaller diameter than the free state outer diameter of the sensor engagement surface. Because the sensor engagement surface is larger than the sensor receipt member engagement surface, an interference fit is preferably established when the sensor is inserted into the sensor receipt member.

When the sensor is inserted into the sensor receipt member, the relatively softer sensor engagement surface is displaced from its free state by the relatively harder sensor receipt member engagement surface. A high stress area is thereby formed in the sensor adjacent the sensor engagement surface. As the sensor is inserted into the sensor receipt member in a particular direction the high stress area will substantially form on the side of the sensor engagement surface opposite the direction of insertion. The relatively softer sensor engagement surface is resilient and will always attempt to return to its free state position to relieve the high stress area. In attempting to return to its free state, the sensor engagement surface will "creep" toward a low stress area.

Over a period of time, the "creep" from high stress area to the low stress area will tend to displace the sensor engagement surface relative to the sensor receipt member engagement surface. This movement will increase in rate if the sensor engagement surface is exposed to heat. Accordingly, the sensor body material will respond by "creeping" toward the vehicle fluid directing component. The present invention thereby takes advantage of the relief of residual stresses formed during insertion of the sensor body to tighten the mounting of the sensor into the vehicle fluid directing component.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 is a general sectional view of a sensor assembly and associated vehicle fluid directing component designed according to the present invention;

FIG. 2 is an expanded sectional view illustrating the engagement member; and

FIG. 2A is an expanded schematic view illustrating the high stress area formed adjacent the engagement surface and displacement thereof.

DETAILED DESCRIPTION OF THE PREFERRED EMBODIMENT

FIG. 1 illustrates an exploded view of a vehicle sensor assembly 10 and a vehicle fluid directing component 12 such as an air intake manifold. The fluid directing component 12 is preferably manufactured of a non-metallic material such as glass filled nylon, PET, LCP, PPC, PBT or various other relatively hard or high density plastics. The sensor assembly 10 includes a sensor body 14 to retain a sensor element 16 such as temperature sensors, manifold absolute pressure (MAP) sensors, mass air flow sensors, potentiometer or other sensor element. The sensor body 14 to is preferably manufactured of a non-metallic material such as polypropylene or various other relatively soft or low density plastics.

A sensor receipt member 18 is preferably formed into the vehicle fluid directing component 12 such as an air intake manifold. As illustrated in FIG. 1, the sensor receipt member 18 extends from an external wall 20 of the fluid directing component 12 and provides an aperture 22 into the interior 24 of the fluid directing component 12. The sensor receipt member 18 preferably includes an engagement surface 26 such as a circumferential ridge 26 which extends inwardly from and inner wall 28 of the aperture 22.

The sensor 10 includes a sensor engagement surface 30 such as groove 30 in a locating segment 32 of the sensor body 14. The locating segment 32 fits within the aperture 26 along a first axis 34. A sensor body segment 36 extends from the locating segment 32 and is preferably fabricated as a cylinder having a diameter greater than the locating segment 32.

A seal 38 such as an O-ring is fitted to the locating segment 32. After assembly, the seal 38 is under compression between the sensor locating segment 32 and the inner wall 28 to assure an air-tight fit of the sensor body 14 in the fluid directing component 12. Although a radial seal is illustrated, it should be understood that other seal configurations and locations can be used, such as a face seal adjacent the body segment 36.

The sensor engagement surface 30 defines an outer periphery dimension. The sensor receipt member engagement surface 26 defines an inner periphery dimension that is of a smaller diameter than the free state outer diameter of the sensor engagement surface 30. Because the sensor engagement surface 30 is larger than the sensor receipt member engagement surface 26, an interference fit is preferably established when the sensor 14 is inserted into the sensor receipt member 18 (illustrated by arrow I).

Referring to FIG. 2, an expanded view of the sensor engagement surface 30 engaged with the sensor receipt member engagement surface 26 is illustrated. When the sensor 14 is inserted into the sensor receipt member 18 (arrow I), the relatively softer sensor engagement surface 30 is displaced from its free state by the relatively harder sensor receipt member engagement surface 26. A high stress area (illustrated schematically at 40) is thereby formed in the sensor body 14 adjacent the sensor engagement surface 30. As the sensor 14 is inserted into the sensor receipt member 18 in the direction of arrow I, the high stress area 40 will substantially form on the side of the sensor engagement surface 30 in the direction of insertion I.

The relatively softer sensor engagement surface 30 is resilient and will always attempt to return to its free state position to relieve the high stress area 40. In attempting to return to its free state, the sensor engagement surface 30 will "creep" toward a low stress area (illustrated schematically at 42). The stress in the high stress area 40 will move in the direction of insertion C from the high stress area 40 toward the low stress area 42 (illustrated schematically by arrow C in FIG. 2A). Over a period of time, the "creep" from high stress area 40 to the low stress area 42 will tend to displace the sensor engagement surface 30 relative to the sensor receipt member engagement surface 26. This movement will increase in rate if the sensor engagement surface 30 is exposed to heat.

Accordingly, the sensor body 14 will respond by "creeping" in the insert mount direction I along the first axis 34. Over time, the sensor body 14 will thereby further seat itself into the sensor receipt member 18. In other words, instead of loosening from the mounted position, the present invention takes advantage of the relief of residual stresses formed during insertion of the sensor body 14 to tighten the engagement between the sensor engagement surface 30 and the sensor receipt member engagement surface 26.

The foregoing description is exemplary rather than limiting in nature. Many modifications and variations of the present invention are possible in light of the above teachings. The preferred embodiments of this invention have been disclosed, however, one of ordinary skill in the art would recognize that certain modifications are possible that would come within the scope of this invention. It is, therefore, to be understood that within the scope of the appended claims, the invention may be practiced otherwise than as specifically described. For that reason the following claims should be studied to determine the true scope of protection given for this invention.

What is claimed is:

1. A sensor assembly for a vehicle fluid directing component comprising:
   a sensor receipt member formed of a first material, said sensor receipt member including an aperture having an engagement surface; and
   a sensor body formed of a second material having a density less than said first material, said sensor body insertable into said aperture in a first direction such that an area of increased stress is produced adjacent said engagement surface, said area of increased stress substantially relievable in a second direction over a period of time.

2. The sensor assembly as recited in claim 1, wherein said engagement surface extends toward an interior of said aperture.

3. The sensor assembly as recited in claim 1, wherein said engagement surface includes a circumferential ridge.

4. The sensor assembly as recited in claim 1, wherein said area of increased stress includes a compressive stress.

5. The sensor assembly as recited in claim 1, wherein said first material includes a polypropylene material.

6. The sensor assembly as recited in claim 1, wherein said second material includes a glass filled nylon material.

7. The sensor assembly as recited in claim 1, further including a seal engagable with said sensor receipt member and said sensor body.

8. The sensor assembly as recited in claim 1, wherein said vehicle fluid directing component includes a non-metallic intake manifold.

9. A sensor assembly for a vehicle fluid directing component comprising:
   a sensor receipt member formed of a first material, said sensor receipt member including an aperture having a circumferential ridge, said circumferential ridge having an inner periphery dimension; and
   a sensor body formed of a second material having a density less than said first material, said sensor body having a sensor engagement surface having a free state outer periphery dimension greater than said inner periphery dimension, said sensor body insertable into said aperture in a first direction such that said circumferential ridge interacts with said sensor engagement surface to form an area of increased stress adjacent said circumferential ridge.

10. The sensor assembly as recited in claim 8, wherein said area of increased stress includes a compressive stress.

11. The sensor assembly as recited in claim 8, said area of increased stress substantially relievable in a second direction over a period of time.

12. The sensor assembly as recited in claim 9, wherein said first material includes a polypropylene material.

13. The sensor assembly as recited in claim 8, wherein said second material includes a glass filled nylon material.

14. The sensor assembly as recited in claim 8, further including a seal engagable with said sensor receipt member and said sensor body.

15. A method of mounting a sensor assembly comprising the steps of:

(1) forming a sensor receipt member of a first material;

(2) forming a sensor body of a second material having a density less than said first material and an engagement surface;

(3) inserting the sensor body into the sensor receipt member in a first direction; and (4) forming an area of increased stress adjacent the engagement surface.

16. A method as recited in claim 15, wherein said step (3) includes providing an interference fit between the sensor body into the sensor receipt member.

17. A method as recited in claim 15, wherein said step (4) includes forming the area of increased stress on a side of the sensor engagement surface substantially opposite the first direction.

18. A method as recited in claim 15, wherein said step (4) includes the relieving of the area of increased stress in a substantially second direction over a period of time such that the sensor body is substantially driven toward the sensor receipt member.

19. A method as recited in claim 18, wherein said second direction is substantially toward said first direction.

20. The sensor assembly as recited in claim 1, wherein said second material includes a substantially solid material.

21. The sensor assembly as recited in claim 9, wherein said second material includes a substantially solid material.

22. The sensor assembly as recited in claim 9, wherein said vehicle fluid directing component includes a non-metallic intake manifold.

23. A method as recited in claim 15, wherein said step (1) includes forming the sensor receipt member within a non-metallic intake manifold.

24. A vehicle air intake manifold assembly comprising:

a non-metallic air intake manifold having a sensor receipt member formed of a first material, said sensor receipt member including an aperture having an engagement surface; and a sensor body formed of a second material having a density less than said first material, said sensor body insertable into said aperture in a first direction such that an area of increased stress is produced adjacent said engagement surface, said area of increased stress substantially relievable in a second direction over a period of time.

25. The vehicle air intake manifold assembly as recited in claim 24, wherein said engagement surface includes a circumferential ridge.

* * * * *